United States Patent [19]
Daloz

[11] 4,439,043
[45] Mar. 27, 1984

[54] APPLIANCE FOR PREPARING MAYONNAISE OR SIMILAR EMULSIONS

[75] Inventor: Joanny Daloz, Is sur Tille, France

[73] Assignee: SEB S.A., Selongey, France

[21] Appl. No.: 394,472

[22] Filed: Jul. 1, 1982

[30] Foreign Application Priority Data

Jul. 31, 1981 [FR] France ................ 81 14917

[51] Int. Cl.³ .................................. B01F 15/02
[52] U.S. Cl. .................... 366/164; 366/168; 366/182; 366/251
[58] Field of Search ................ 141/34; 366/152, 153, 366/162, 163, 164, 168, 169, 182, 240, 244, 245, 247, 249, 251, 264, 265, 279, 290, 291, 314, 332, 333, 334

[56] References Cited

U.S. PATENT DOCUMENTS 1,253,394  1/1918  Lambie ............................ 366/164
3,164,303  1/1965  Trautmann ...................... 366/333
3,289,897  12/1966  Ginsberg ........................ 366/251

FOREIGN PATENT DOCUMENTS 1089420  3/1955  France.

Primary Examiner—Robert W. Jenkins
Assistant Examiner—Arthur D. Dahlberg
Attorney, Agent, or Firm—Young & Thompson

[57] ABSTRACT

The appliance comprises a mixing chamber within which a mechanical beater is rotatably mounted, an oil reservoir, a sliding separator placed beneath the oil reservoir and a mixing chamber placed beneath the separator. Oil is fed from the reservoir to the mixing chamber via a calibrated passage which opens into the mixing chamber in a suction zone created as a result of the centrifugal force produced by the mechanical beater.

11 Claims, 5 Drawing Figures

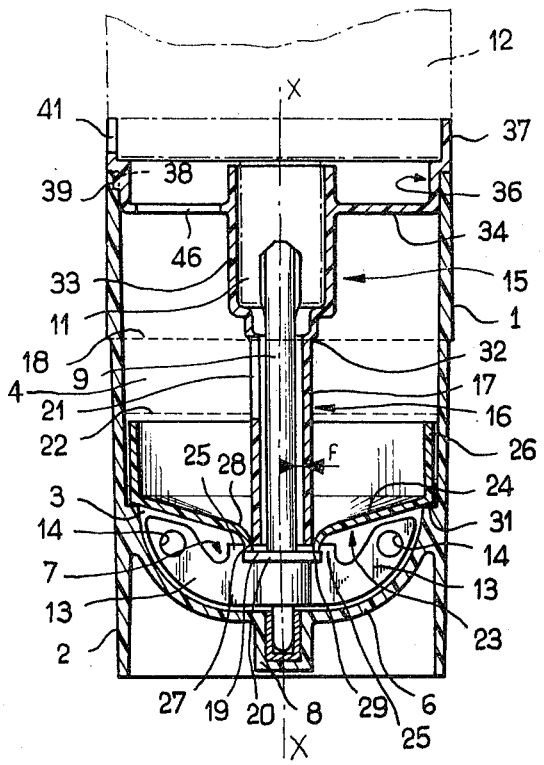
FIG_1
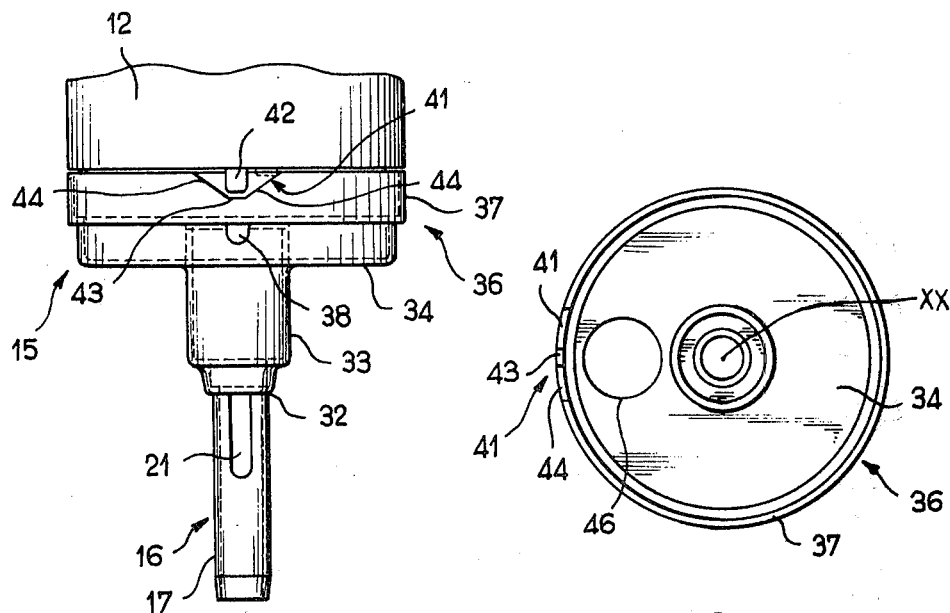
FIG_2  FIG_3

APPLIANCE FOR PREPARING MAYONNAISE OR SIMILAR EMULSIONS

This invention relates to a domestic appliance for preparing mayonnaise or similar food emulsions.

Emulsions of the type just mentioned can be prepared by means of a hand-operated or mechanical whisk for beating and stirring the ingredients.

It is known that, under these conditions, successful thickening of mayonnaise is uncertain. In particular, oil has to be added to the other ingredients (egg yolk and mustard) in a substantially continuous manner at a given rate of feed, thus calling for a particular degree of experience and skill on the part of the user.

With a view to circumventing these difficulties, French patent No 1,089,420 has proposed an appliance comprising a mixing chamber surmounted by an oil reservoir connected to the mixing chamber by means of a calibrated passage. Thus, while mixing with a rotary paddle mounted within the mixing chamber, the oil flows into said chamber at least at lower velocity if not at a uniform rate and is thus incorporated in the mixture progressively as it flows in.

An apparatus of this type does admittedly reduce the risk of failure in the preparation of mayonnaise. However, it does have the disadvantage of being bulky since the mixing chamber and the oil reservoir necessarily have an appreciable volume in both cases.

The aim of the present invention is to overcome this disadvantage by providing a domestic appliance which is particularly compact and permits the preparation of mayonnaise without requiring any special skill.

The invention is thus directed to a domestic appliance for preparing mayonnaise or similar emulsions, provision being made for a mixing chamber in which is mounted a rotary mechanical beater, an oil reservoir, a calibrated passage between the oil reservoir and the mixing chamber, and means for causing the oil to flow from the reservoir to the mixing chamber via the calibrated passage.

According to the invention, the distinctive feature of said appliance lies in the fact that the reservoir and the mixing chamber are provided within an appliance body on each side of a sliding separator.

In order to prepare a mayonnaise by means of the appliance described in the foregoing, the desired quantity of oil is placed in the oil reservoir whilst the egg yolk, spices, vinegar and mustard are placed together within the mixing chamber. Before the mixing operation begins, the separator is located in an end position in which the mixing chamber is as small as possible whilst the oil reservoir is as large as possible. The beater is started-up and begins by mixing the above-mentioned ingredients contained within the mixing chamber. The means for transferring the oil from the reservoir to the mixing chamber via the calibrated passage have the effect of gradually adding the oil to this mixture. The mixture which is being stirred and the volume of which increases progressively has the effect of gradually thrusting back the sliding separator in a direction corresponding to a reduction in volume of the oil reservoir. When the mayonnaise has been completely formed, the separator occupies or is close to another end position in which the oil reservoir is as small as possible whereas the mixing chamber is as large as possible.

The invention, based on the finding that it is never necessary to have a large mixing chamber and a large oil reservoir at the same time during the process of preparation of a mayonnaise, thus permits the construction of a particularly compact appliance in which the reservoir and the mixing chamber have only a volume which is adapted at each instant.

These and other features of the invention will be more apparent upon consideration of the follownng description and accompanying drawings, wherein:

FIG. 1 is an axial sectional view of the appliance for preparing mayonnaise prior to startup of the mechanical beater;

FIG. 2 is a side view in elevation showing the oil-feed regulator of the appliance of FIG. 1;

FIG. 3 is a top view of the regulator of FIG. 2;

Figure 4:
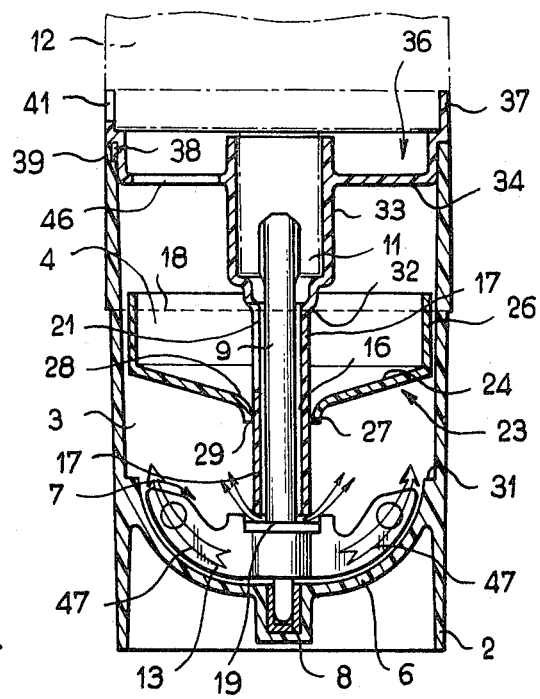
FIGS. 4 and 5 are views which are similar to FIG. 1 but show the appliance respectively during and at the end of the mixing operation.
Figure 5:
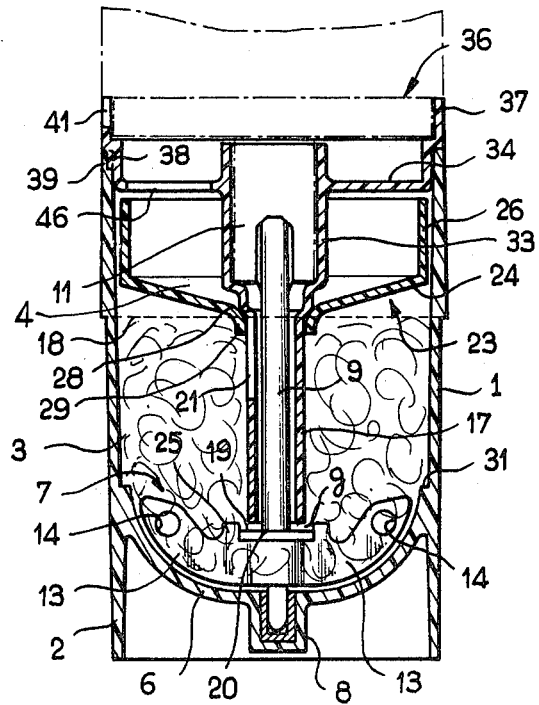

As shown in FIGS. 1, 4 and 5, the appliance has a body 1 which is of generally cylindrical shape but slightly widened-out towards the top in order to facilitate removal from the mold. The lower end of the body 1 forms an annular base 2. Provision is made within the body 1 for a mixing chamber 3 and for an oil reservoir 4 located above said mixing chamber. At the lower end, the mixing chamber 3 is limited by a bottom wall 6 having a concave face directed towards the oil reservoir 4. In the example shown in the drawings, the bottom wall 6 is a substantially hemispherical bowl. Within the mixing chamber 3, a mechanical beater 7 is mounted so as to be capable of rotating about the axis X—X of the appliance by means of a blind nipple bearing 8 formed at the center of the bowl 6 and by means of a driving shaft 9 which extends through the oil reservoir 4. Said shaft is connected by means of a removable coupling 11 to an electric motor 12 which is mounted above the reservoir 4. The beater 7 is adapted to carry two paddles, the bottom edge of each paddle being cut so as to correspond in shape to the profile of the bowl 6. An opening 14 which facilitates the formation of emulsions is formed near the end of each paddle 13.

The reservoir 4 and the mixing chamber 3 are connected to each other by means of a calibrated passage 16. In the example which is illustrated, the passage 16 is formed by means of an oil-feed regulator 15 comprising a well 17 through which the driving shaft 9 of the beater 7 passes with a calibrated radial clearance f. The upper end of the well 17 coincides with the maximum level 18 of oil within the reservoir 4. The well 17 is provided with an elongated slot 21 which extends in the axial direction from the maximum oil level 18 to a minimum oil level 22 within the reservoir 4 and establishes a communication between the reservoir 4 and the interior of the well 17. At the lower end, the well 17 opens into the mixing chamber 3 within the suction zone which results from the centrifugal effect produced by the mechanical beater 7. An annular gap g (as shown in FIG. 5) is defined between said lower end of the well 17 and an annular shoulder 19 carried by an annular flange 20 of the beater 7. Furthermore, the paddles 13 of the beater 7 are each adapted to carry a fin 25 (FIG. 1) which is directed upwards to the level of the lower end of the well 17. The radially inner edge of each fin 25 is located in immediate proximity to the gap g.

In the case of an application for preparing approximately 150 g of mayonnaise in a single operation, the following numerical examples can be given:

width of the elongated slot 21: 5 mm
height of the slot 21: 20 mm radial clearance f: 1.5 mm
annular gap g: 1.4 to 2.2 mm In accordance with the invention, the oil reservoir 4 and the mixing chamber 3 are arranged on each side of a sliding separator 23.

In the example shown in the drawings, the separator 23 is a vessel having a bottom wall 24 which is of conical shape so as to be downwardly inclined from its periphery to the axis X—X of the appliance. The vessel 23 also has a substantially cylindrical side wall 26 which is directed towards the reservoir 4 and adjacent to the body 1.

The bottom wall 24 is provided at the center with a bore 27 for permitting displacement of the vessel 23 in sliding motion and in substantially fluid-tight relation to the well 17. The upper portion of the bore 27 is flared-out in a curved profile 28 in order to be joined to the bottom wall 24 of the vessel 23. At the end which is directed towards the bowl 6, the bore 27 terminates in an annular surface 29 which is applied in fluid-tight contact with the annular shoulder 19 of the beater 7 before this latter is set into rotation and thus has the effect of closing-off the annular gap g. In this position, the separator 23 is also applied in substantially fluid-tight manner against an annular shoulder 31 which is formed on the internal wall of the body 1 and substantially at one-quarter of the height of said wall at the point of junction of this latter with the bowl 6, said annular shoulder being directed towards the reservoir 4.

Above the well 17, the regulator 15 has an annular shoulder 32 which is directed towards the mixing chamber 3 and is intended to serve as a stop for the separator 23 at the end of preparation of the mayonnaise (as shown in FIG. 5). Beyond the annular shoulder 32, the regulator 15 is provided with a sleeve 33 which surrounds and covers the removable coupling 11. The sleeve 33 is rigidly fixed to a lid 34 which serves to protect the motor 12 against projections of oil. Said lid 34 is provided with an upwardly-directed double peripheral flange 36, the lower portion of which is engageable within the body 1 whilst the upper portion 37 has a stepped annular enlargement which is fitted around the motor 12.

On its outer face, the lower portion of the flange 36 has a projecting portion 38 which is intended to cooperate with a recess 39 of corresponding shape in the body 1 so as to secure this latter against rotation with respect to the regulator 15.

The upper portion 37 of the flange 36 is provided with a notch 41 directed towards the motor 12, said notch being intended to accommodate a push-button 42 which is mounted on the lower edge of the motor 12 and directed towards the body 1. The push-button 42 initiates startup of the motor 12 when it is depressed. The notch 41 has a flat bottom portion 43 and two symmetrical inclined edges 44 and is of sufficient depth to ensure that the push-button 42 is in the position of maximum extension when it is located opposite to the bottom portion 43.

An oil filling orifice 46 is pierced in the cover 34 opposite to the notch 41.

Preferably, the body 1, the regulator 15 and the separator 23 are formed of plastic material.

The appliance described in the foregoing operates as follows:

At the outset, the five essential components of the appliance, namely the body 1, the motor 12, the regulator 15, the separator 23 and the beater 7 with its shaft 9 are in the disassembled state. The basic ingredients for the preparation of mayonnaise, namely egg yolk, mustard, salt, pepper, vinegar, spices, crushed garlic, and so on, are placed in the bowl 6. The capacity of said bowl 6 is such as to ensure that this latter is substantially filled when the quantity of ingredients corresponds to the maximum quantity of mayonnaise which the appliance is designed to produce in a single operation.

The beater 7 is then fitted in position within the blind nipple bearing 8. The beater paddles are thus completely immersed in the basic ingredients and set back with respect to the annular shoulder 31.

The separator 23 is then placed within the bowl 6 with its bore 27 in the downwardly directed position. Said separator is then pushed down by hand until it is applied against the annular shoulder 19 of the beater 7 and the annular shoulder 31 of the body 1. Thus the basic ingredients are contained within the mixing chamber 3 which has been made substantially fluid-tight by means of the separator 23.

The regulator 15 is placed in position on the body 1 by engaging the well 17 around the driving shaft 9 and within the bore 27 until the annular flange 36 is forcibly engaged in the upper end of the body 1.

By placing the neck of an oil bottle in the notch 41, oil is poured through the orifice 46 into the reservoir 4, the bottom of which is formed by the conical end-wall 24 of the separator 23. A few leakages of oil may take place between the separator 23 and the annular shoulder 31 or between the separator 23 and the annular shoulder 19 by reason of the low efficiency of the sealing means provided at these locations. However, the air which is trapped between the bottom wall 24 of the separator 23 and the ingredients at the time of filling of the reservoir 4 considerably restricts the flow of oil until this latter is practically reduced to zero.

The motor 12 is then forcibly engaged in the flange 37 and coupled to the driving shaft 9 by means of the removable coupling 11 while taking care to ensure that the push-button 42 is located opposite to the notch 41.

By holding the body 1 in one hand and the motor 12 in the other, the motor 12 is rotated to a slight extent around the axis X—X either in one direction or in the other with respect to the body 1. The result thereby achieved is that the push-button 42 (shown in FIG. 2) encounters one of the oblique edges 44 of the notch 41 and is thus downwardly displaced within the body of the motor 12 until it reaches the position shown in dashed lines in FIG. 2. This causes the motor to start-up in complete safety since, if the motor 12 or the body 1 is released, these two units will return to their initial relative angular positions by extension of the push-button 42 which is applied against the inclined edge 44 of the notch 41. Furthermore, if the regulator 15 is disengaged from the motor 12, this also causes extension of the push-button 42 and consequently stops the motor 12.

As soon as the motor 12 has been started-up, the ingredients contained in the mixing chamber 3 tend to move away from the axis X—X under the action of the centrifugal force produced by the paddles 13.

The concave shape of the bowl 6 combined with the action of centrifugal force on the ingredients produces a thrust 47 which has the effect of unseating the separator 23 with respect to the annular shoulders 19 and 31.

As soon as unseating of the separator 23 has taken place, the gap g between the well 17 and the annular shoulder 19 is open. Since said gap is located in the zone of centrifugal suction by the beater 7, the oil supplied from the reservoir 4 is sucked into the chamber 3 via the elongated slot 21, the cylindrical gap between the well 17 and the driving shaft 9, and the gap g.

As it is admitted into the chamber 3, the oil is mixed with the other ingredients by the beater 7. The emulsion which begins to form tends to agglutinate within the openings 14 of the paddles 13, thus consequently reducing the speed of the motor from the full speed rating of about 20,000 to 24,000 rpm down to the relatively low speed of 3500 to 4000 rpm which is suitable for the preparation of mayonnaise. By reason of the constant admission of oil, the volume of the mixture increases and produces a progressive upward displacement of the separator.

Even when the quantity of mixture within the chamber 3 becomes substantial, the supply of oil continues since the oil is centrifuged in contact with the annular flange 20 whilst the fins 25 prevent the relatively compact mixture from closing-off the gap g by capillarity, for example.

When there is practically no more oil, the separator 23 arrives in abutting contact with the annular shoulder 32 of the regulator 15. By virtue of the conical shape of the bottom wall 24 and of the rounded profile 28 which joins this latter to the bore 27, the small remaining quantity of oil tends to collect in an annular channel around the well 17. This is conducive to absorption of the remaining oil by the well 17 and consequently to complete utilization of the oil contained in the reservoir 4 at each operation involving the preparation of mayonnaise. Both said small annular channel and the upper end of the elongated slot 21 are located below the line of contact between the rounded profile 28 of the separator 23 and the annular shoulder 32. In consequence, the remaining oil is sucked into the well without being accompanied by large quantities of air.

At this stage, the motor 12 is stopped and the parts are disassembled one by one: the motor 12, the regulator 15, the separator 23 and the beater 7. The mayonnaise remains contained within the body 1.

The appliance according to the invention is of highly compact design by virtue of its sliding separator and also makes it possible to prepare mayonnaise in a particularly rapid and reliable manner. In fact, since the volume of the mixing chamber 3 is just sufficient to confine the mayonnaise during production of this latter, this accordingly prevents a certain quantity of mixture from being projected on the walls and thus escaping from the mixing operation. As the separator 23 moves upwards, so it is less and less subjected to the upwardly moving forces arising from centrifugation of the mixture but compensation for this reduction is achieved by virtue of the fact that the quantity of oil which presses down on the separator 23 also decreases. Since the elongated slot 21 is located in the vicinity of the surface of the oil within the reservoir 4, the level of which does not undergo any appreciable variation during preparation of the mayonnaise, the gravitational pressure which assists the flow of oil to the chamber 3 is substantially constant. Since the suction of oil is also substantially constant, the appliance according to the invention ensures that the supply of oil takes place with remarkable uniformity. Moreover, the fact that the oil is supplied by suction makes it possible to prepare mayonnaise very rapidly, namely in seven to thirty seconds for a quantity of about 150 g of mayonnaise.

A further point worthy of note is that, prior to commencement of the mixing operation, the side wall 26 of the separator 23 is very close to the internal wall of the body 1 and this proximity is a contributory factor in the fluid-tightness provided between the separator 23 and the annular shoulder 31. When the separator 23 has been unseated from the annular shoulder 31, the wall 26 is located at a progressively increasing distance from the internal wall of the body 1 by reason of the slightly flared-out shape of said body which is necessary in order to permit removal of this latter from the mold. This effect is highly favorable by reason of the fact that, once the separator 23 has been unseated, the suction through the gap g becomes preponderant and the fluid-tightness around the separator 23 has less importance. It is preferable on the contrary to provide an oil film between the cylindrical separator wall 26 and the body 1 in order to permit efficient sliding motion of the separator.

As will readily be apparent, the invention is not limited to the example described in the foregoing with reference to the accompanying drawings and many alternative arrangements can accordingly be contemplated without thereby departing either from the scope or the spirit of the invention.

From this it follows that the supply of oil could be carried out solely by gravity feed from the reservoir.

In a further alternative arrangement, the displacement of the separator 23 in sliding motion towards the reservoir 4 during the mixing operation could be produced solely by an increase in volume of the stirred mixture without endeavoring to assist this sliding motion but by utilizing the action of centrifugal force.

As shown in FIG. 5, the bore 27 overlaps the elongated slot 21 when the separator 23 reaches its top end position. It could consequently be expected that the oil is supplied through the slot 21 alone since this latter establishes a direct communication between the reservoir 4 and the mixing chamber 3. This would have the disadvantage of giving a greasy appearance to the surface of the mayonnaise which has been prepared. In practice, this direct supply of oil is very limited by reason of the intense suction from the gap g. It would be possible, however, to dispense with this direct supply altogether by replacing the elongated slot 21 and providing two superposed slots so that, when the separator 23 is in the top position, one of these slots is located above the bore 27 whilst the other slot is located beneath this latter.

Furthermore, if it is feared that the double application of the separator 23 against the annular shoulders 19 and 31 is difficult to achieve in practice, a small clearance of the order of 0.15 to 0.4 mm, for example, can be provided between the separator in the rest position and the annular shoulder 19. The oil leakage which would consequently take place before the mechanical beater is started-up has no incidence on the quality of the mayonnaise.

What is claimed is:

1. A domestic appliance for preparing mayonnaise or similar emulsions, comprising a mixing chamber in which is mounted a rotary mechanical beater, an oil reservoir, a calibrated communication passage between the oil reservoir and the mixing chamber, and means for causing the oil to flow from the reservoir to the mixing chamber via said calibrated communication passage during the mixing operation, the reservoir and the mixing chamber being arranged within an appliance body on each side of a sliding separator, the end of said calibrated communication passage which is nearest the mixing chamber opening into a suction zone of the beater.

2. An appliance according to claim 1 wherein, in order to assist the process of suction of oil into the mixing chamber, the beater has a rotating surface which is intended to be in contact with the oil directly as it passes out of the calibrated communication passage in order to establish favorable conditions for centrifugation of the oil.

3. An appliance according to claim 1, wherein the beater has fins arranged within the zone in which the calibrated communication passage opens into the mixing chamber in order to prevent the mixture from collecting in said zone during the mixing operation.

4. An appliance according to claim 1, wherein the mixing chamber wall opposite to the separator has a concave inner face which is directed towards the oil reservoir.

5. A domestic appliance for preparing mayonnaise or similar emulsions, comprising a mixing chamber in which is mounted a rotary mechanical beater, an oil reservoir, a calibrated communication passage between the oil reservoir and the mixing chamber, and means for causing the oil to flow from the reservoir to the mixing chamber via said calibrated communication passage during the mixing operation, wherein the reservoir and the mixing chamber are arranged within an appliance body on each side of a sliding separator, said calibrated communication passage being formed within a well which communicates with the oil reservoir and with the mixing chamber, said separator being traversed by the well and being slidably mounted on said well.

6. An appliance according to claim 5, wherein a calibrated gap is provided between the end of the well and an annular shoulder of the beater.

7. An appliance according to claim 6, wherein the separator is applied in the rest position against the annular shoulder of the beater and thus shuts-off the calibrated gap between the well and the beater.

8. An appliance according to claim 5 wherein, under service conditions, the drive motor of the beater is located above the oil reservoir and wherein the driving shaft of the beater is mounted within the well with a predetermined radial clearance.

9. An appliance according to claim 5, wherein the well communicates with the oil reservoir through an elongated slot which extends axially upwards from the minimum oil-filling level.

10. An appliance according to claim 5, wherein the separator is a vessel having a cylindrical side wall, the portion of said side wall which is directed towards the oil reservoir being adjacent to the wall of the body and the bottom wall of said vessel being downwardly inclined from the periphery to the axis of the appliance.

11. An appliance according to claim 10, wherein the separator slides on the well by means of a bore which is flared-out towards the reservoir in a curved profile.

* * * * *